(12) United States Patent
Park et al.

(10) Patent No.: US 7,998,433 B2
(45) Date of Patent: Aug. 16, 2011

(54) VALVE UNIT AND APPARATUS HAVING THE SAME

(75) Inventors: Jong-myeon Park, Seoul (KR);
Jeong-gun Lee, Seoul (KR);
Yoon-kyoung Cho, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 878 days.

(21) Appl. No.: 11/625,009

(22) Filed: Jan. 19, 2007

(65) Prior Publication Data

US 2007/0231216 A1 Oct. 4, 2007

(30) Foreign Application Priority Data

Apr. 4, 2006 (KR) .................. 10-2006-0030496
Sep. 25, 2006 (KR) .................. 10-2006-0092924

(51) Int. Cl.
*B01L 3/00* (2006.01)
(52) U.S. Cl. .......... 422/500; 422/50; 436/180; 251/181; 251/182
(58) Field of Classification Search ............ 422/99–100, 422/50, 500; 436/180; 137/251.1; 251/181–182
See application file for complete search history.

(56) References Cited

U.S. PATENT DOCUMENTS

| 6,063,589 | A * | 5/2000 | Kellogg et al. ................ 435/24 |
| 6,302,134 | B1 | 10/2001 | Kellogg et al. |
| 6,375,901 | B1 | 4/2002 | Robotti et al. |
| 6,565,526 | B2 | 5/2003 | Seward |
| 6,575,188 | B2 * | 6/2003 | Parunak ................ 137/251.1 |
| 6,679,279 | B1 | 1/2004 | Liu et al. |
| 2003/0156991 | A1 | 8/2003 | Halas et al. |
| 2007/0092409 | A1 | 4/2007 | Beatty et al. |

FOREIGN PATENT DOCUMENTS

| JP | 61-205793 | 9/1986 |
| JP | 2002-215241 | 7/2002 |
| WO | 2005/107947 | 11/2005 |

OTHER PUBLICATIONS

K. Tashiro, A particles and biomolecules sorting micro flow system using thermal gelation of methyl cellulose soltuion, 2001, whole document.*
Kwang W Oh et al., A phase change microvalve using a meltable magnetic material: Ferro-Wax, Oct. 9-13, 2005, Bio Lab, Samsung Advanced Institue of Technology, pp. 554-556.*
"Self-Contained, Fully Integrated Biochip for Sample Preparation, Polymerase Chain Reaction Amplification, and DNA Microarray Detection"; Authors: Robin Hui Liu, et al.; Anal. Chem. 2004, 76, 1824-1831.

(Continued)

Primary Examiner — Jyoti Nagpaul
(74) Attorney, Agent, or Firm — Sughrue Mion, PLLC (57) ABSTRACT

A valve unit and an apparatus having the same include a plug which includes a phase change material in a solid state at a room temperature and a plurality of fine heat-dissipating particles dispersed in the phase change material. The fine heat-dissipating particles dispersed in the phase change material dissipate heat by absorbing an electromagnetic wave energy generated by electromagnetic wave radiation from the outside and block fluid flow in a path formed by a channel. As an external energy source irradiates an electromagnetic wave on the plug, the plurality of fine heat-dissipating particles dissipate heat and the phase change material becomes molten, thus opening the path to allow the fluid to flow.

43 Claims, 5 Drawing Sheets

OTHER PUBLICATIONS

Liu et al.; "Self-Contained, Fully Integrated Biochip for Sample Preparation, Polymerase Chain Reaction Amplification, and DNA Microarray Detection"; Analytical Chemistry, vol. 76, No. 7, Apr. 1, 2004, pp. 1824-1831.

Communication from the State Intellectual Property Office of P.R. China, dated Apr. 19, 2011, in counterpart Chinese Application No. 200710092051.1.

* cited by examiner

VALVE UNIT AND APPARATUS HAVING THE SAME

This application claims priority to Korean Patent Application Nos. 10-2006-0030496 and 10-2006-0092924, filed on Apr. 4, 2006 and Sep. 25, 2006, respectively, and all the benefits accruing therefrom under 35 U.S.C. §119, the contents of which in their entirety are herein incorporated by reference.

BACKGROUND OF THE INVENTION

1. Field of the Invention

The present invention relates to a valve unit which opens a channel at a predetermined time so that a fluid can flow along the channel, and an apparatus having the same.

2. Description of the Related Art

For example, a valve unit includes a microchannel forming a path for a fluid is formed in a chip used in a biochemical reaction such as a polymerase chain reaction ("PCR"). The chip is formed of glass or silicon. The valve unit blocks the microchannel so that a biochemical fluid cannot flow through the microchannel and opens the microchannel at a certain time to cause the fluid to flow.

Figure 1:
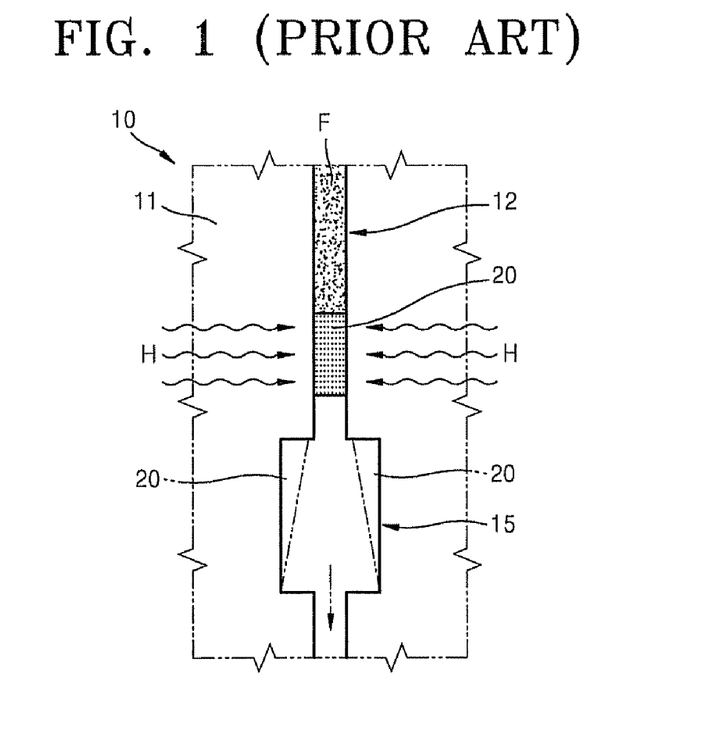
FIG. 1 is a plan view of a conventional valve unit.

FIG. 1 is a plan view of a conventional valve unit 10, which is disclosed in Anal. Chem. Vol. 76, pp. 1824-1831, 2004.

Referring to FIG. 1, the conventional valve unit 10 includes a microchannel 12 which forms a path for a fluid (F), a paraffin wax 20 which blocks the microchannel 12 so that the fluid (F) cannot flow through the microchannel 12, and a wax chamber 15, which is disposed adjacent to the paraffin wax 20 and has an extended channel width compared to a channel width of microchannel 12. Heat (H) is applied to the paraffin wax 20 at a certain time allowing a flow of the fluid (F). When the paraffin wax 20 is molten and the microchannel 12 is opened due to the heat (H), the fluid (F) which has been in a non-circulating state, flows in a direction of an arrow (that is, from upwards to downwards) indicated at a bottom portion of the wax chamber 15. The molten paraffin wax 20 is condensed again in the wax chamber 15 and does not disturb the flow of the fluid (F).

However, in the conventional valve unit 10, a large amount of time is required to melt the paraffin wax 20 by heating. It is difficult to precisely control a time for opening the microchannel 12, and a heating unit for melting the paraffin wax 20 should be directly provided on a substrate 11 on which the microchannel 12 is formed. For example, it is difficult to make the valve unit 10 small. When directly providing the heating unit on the substrate 11, there is a difference in thermal conductivity according to a material used in forming the substrate 11, which causes a difference in precision for opening the microchannel 12. Thus, when plastics are used to reduce costs for manufacturing a chip used in a biochemical reaction, the thermal conductivity of plastics is much lower than that of glass or silicon of the chip. As such, precision in opening the microchannel 12 is lowered.

BRIEF SUMMARY OF THE INVENTION

The present invention provides a valve unit having an improved structure in which a channel can be more quickly opened, and an apparatus having the same.

According to an exemplary embodiment of the present invention, a valve unit includes: a plug including a phase change material in a solid state at a room temperature and a plurality of fine heat-dissipating particles dispersed in the phase change material, the heat-dissipating particles dissipate heat by absorbing an electromagnetic wave energy generated by electromagnetic wave radiation from the outside and block fluid flow by closing a path formed by a channel; and an external energy source irradiating an electromagnetic wave on the plug, wherein, irradiation of the electromagnetic wave on the plug from the outside causes the plurality of fine heat-dissipating particles to dissipate heat and cause the phase change material to be molten opening the path.

The valve unit may further comprise a phase change material chamber, which is disposed in a position where a flow of the fluid is not disturbed and in which the molten phase change material and the fine heat-dissipating particles mixed therein are accommodated.

The phase change material chamber may be formed in the channel and have a more extended width than a width of the channel.

The valve unit may further comprise a light-path changing unit changing a light-path of the electromagnetic wave so that the electromagnetic wave irradiated by the external energy source can be directed toward the plug.

The light-path changing unit may comprise at least one mirror.

The external energy source may include a laser light source irradiating a Laser beam.

The external energy source may include a laser diode.

The laser irradiated by the laser light source may be a pulse electromagnetic wave having an energy of at least 1 mJ/pulse.

The laser irradiated by the laser light source may be a continuous wave electromagnetic wave having an output of at least about 10 mW.

The laser irradiated by the laser light source may have a wavelength of about 750 nm to about 1300 nm.

The fine heat-dissipating particles may have a diameter of about 1 nm to about 100 µm.

The fine heat-dissipating particles may be dispersed in a hydrophobic carrier oil.

The fine heat-dissipating particles may include a ferromagnetic material or metallic oxide.

The metallic oxide may include at least one material selected from the group consisting of $Al_2O_3$, $TiO_2$, $Ta_2O_3$, $Fe_2O_3$, $Fe_3O_4$ and $HfO_2$.

The fine heat-dissipating particles may have at least one grain shape selected from the group consisting of a polymer, a quantum dot, and a magnetic bead.

The magnetic bead includes at least one material selected from the group consisting of Fe, Ni, Cr and an oxide thereof.

The phase change material may be at least one selected from the group consisting of a wax, a gel and a thermo-plastic resin.

The wax may be at least one selected from the group consisting of a paraffin wax, a microcrystalline wax, a synthetic wax and a natural wax.

The gel may be at least one selected from the group consisting of a polyacrylamide, a polyacrylate, a polymethacrylate and a polyvinylamide.

The thermo-plastic resin may be at least one selected from the group consisting of a cycloolefin copolymer ("COC"), polymethylmethacrylate (acrylic) ("PMMA"), polycarbonate ("PC"), polystyrene ("PS"), polyoxymethylene (acetal) ("POM"), perfluoroalkoxy ("PFA"), polyvinyl alcohol (or polyvinyl acetate) ("PVC"), polypropylene ("PP"), polyethylene terephthalate ("PET"), polyetheretherketone ("PEEK"), polyamide (nylon) ("PA"), polysulfone ("PSU") or polyvinylidene fluoride ("PVDF").

The substrate may have a disc shape, the channel may extend in a radial direction of the substrate and the biochemical fluid may be pumped in a radially outwardly direction of the substrate by a centrifugal force generated by rotation of the substrate.

A plurality of channels, each having a reaction chamber, may be provided on the substrate.

According to another exemplary embodiment of the present invention, a valve unit an apparatus having the same include: a plug including a phase change material in a solid state at a room temperature and blocks fluid flow by closing a path formed by a channel; and an external energy source irradiating an electromagnetic wave on the plug, wherein an electromagnetic wave irradiated on the plug from the outside causes the phase change material to absorb an electromagnetic wave energy from the electromagnetic wave and become molten, causing the path to open.

According to another exemplary embodiment of the present invention, a valve unit includes; a plug including a phase change material in a solid state at a room temperature and which is disposed proximate to a fluid flow channel, and an external energy source which irradiates an electromagnetic wave on the plug, wherein, when the electromagnetic wave is irradiated on the plug from the outside, the phase change material absorbs an electromagnetic wave energy from the electromagnetic wave, becomes molten, and flows into the channel to obstruct fluid flow.

According to another exemplary embodiment of the present invention, a valve unit includes; a substrate, a channel formed in the substrate through, a plug disposed opposite the channel, the plug including a phase change material and a plurality of fine heat-dissipating particles dispersed in the phase change material; and an external energy source which irradiates an electromagnetic wave on the plug, wherein when the electromagnetic wave is irradiated on the plug from the outside, the plurality of fine heat-dissipating particles dissipate heat and the phase change material become molten, the plug expands into the channel thereby obstructing it.

According to another exemplary embodiment of the present invention an apparatus having a valve unit includes; a channel forming a path for a biochemical fluid, a substrate having a reaction chamber in which a biochemical reaction of the biochemical fluid is performed, and a valve unit blocking the path and opening the path at a predetermined time, wherein the valve unit includes; a plug including a phase change material in a solid state at a room temperature disposed opposite the channel, and an external energy source which irradiates an electromagnetic wave on the plug, wherein, when the electromagnetic wave is irradiated on the plug from the outside, the phase change material absorbs an electromagnetic wave energy from the electromagnetic wave and becomes molten obstructing the path to reduce a fluid flow therethrough.

BRIEF DESCRIPTION OF THE DRAWINGS

The above and other aspects, features and advantages of the present invention will become more apparent by describing in more detail exemplary embodiments thereof with reference to the attached drawings in which.

DETAILED DESCRIPTION OF THE INVENTION

Hereinafter, the present invention will be described in detail by explaining exemplary embodiments of the invention with reference to the attached drawings. This invention may, however, be embodied in many different forms and should not be construed as limited to the exemplary embodiments set forth herein. Rather, these embodiments are provided so that this disclosure will be thorough and complete, and will fully convey the scope of the invention to those skilled in the art. In the drawings, lengths and sizes of layers and regions may be exaggerated for clarity.

It will be understood that when an element or layer is referred to as being "on" another element or layer, the element or layer can be directly on another element or layer or intervening elements or layers. In contrast, when an element is referred to as being "directly on" another element or layer, there are no intervening elements or layers present. Like numbers refer to like elements throughout. As used herein, the term "and/or" includes any and all combinations of one or more of the associated listed items.

It will be understood that, although the terms first, second, third, etc., may be used herein to describe various elements, components, regions, layers and/or sections, these elements, components, regions, layers and/or sections should not be limited by these terms. These terms are only used to distinguish one element, component, region, layer or section from another element, component, region, layer or section. Thus, a first element, component, region, layer or section discussed below could be termed a second element, component, region, layer or section without departing from the teachings of the present invention.

Spatially relative terms, such as "below" or "lower" and the like, may be used herein for ease of description to describe the relationship of one element or feature to another element(s) or feature(s) as illustrated in the figures. It will be understood that the spatially relative terms are intended to encompass different orientations of the device in use or operation, in addition to the orientation depicted in the figures. For example, if the device in the figures is turned over, elements described as "below" other elements or features would then be oriented "above" the other elements or features. Thus, the exemplary term "below" can encompass both an orientation of above and below. The device may be otherwise oriented (rotated 90 degrees or at other orientations) and the spatially relative descriptors used herein interpreted accordingly.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

Embodiments of the invention are described herein with reference to cross-section illustrations that are schematic illustrations of idealized embodiments (and intermediate structures) of the invention. As such, variations from the shapes of the illustrations as a result, for example, of manufacturing techniques and/or tolerances, are to be expected. Thus, embodiments of the invention should not be construed as limited to the particular shapes of regions illustrated herein but are to include deviations in shapes that result, for example, from manufacturing.

For example, an implanted region illustrated as a rectangle will, typically, have rounded or curved features and/or a gradient of implant concentration at its edges rather than a binary change from implanted to non-implanted region. Likewise, a buried region formed by implantation may result in some implantation in the region between the buried region and the surface through which the implantation takes place. Thus, the regions illustrated in the figures are schematic in nature and their shapes are not intended to illustrate the actual shape of a region of a device and are not intended to limit the scope of the invention.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

Figure 2:
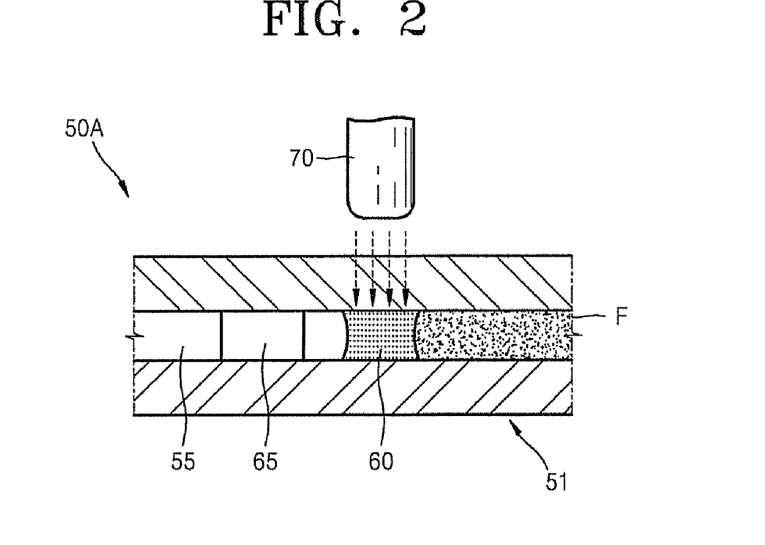
FIG. 2 is a cross-sectional view of an exemplary embodiment of a valve unit according to the present invention.
Figure 3:
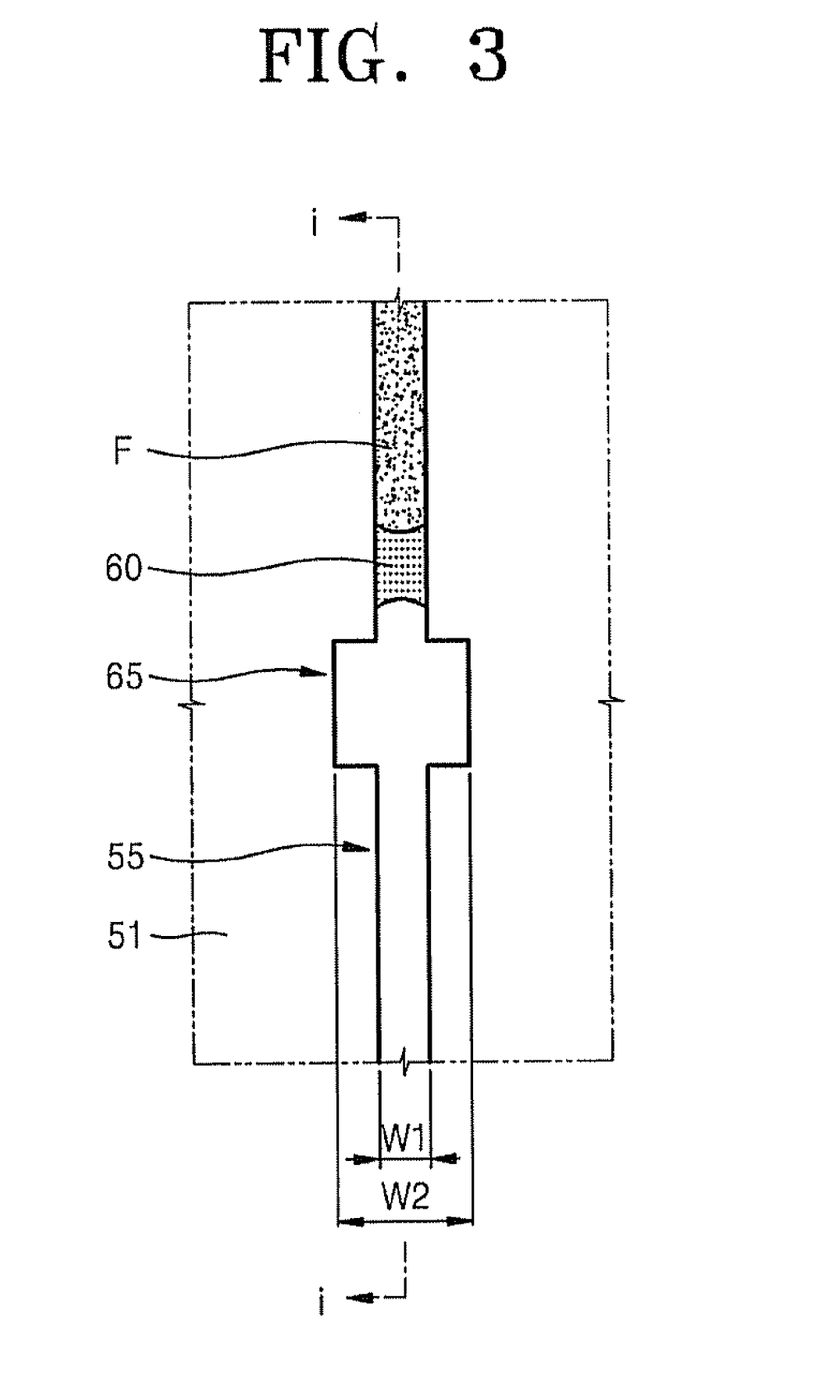
FIG. 3 is a plan view of a substrate of the valve unit illustrated in FIG. 2 when a channel is closed.
Figure 4:
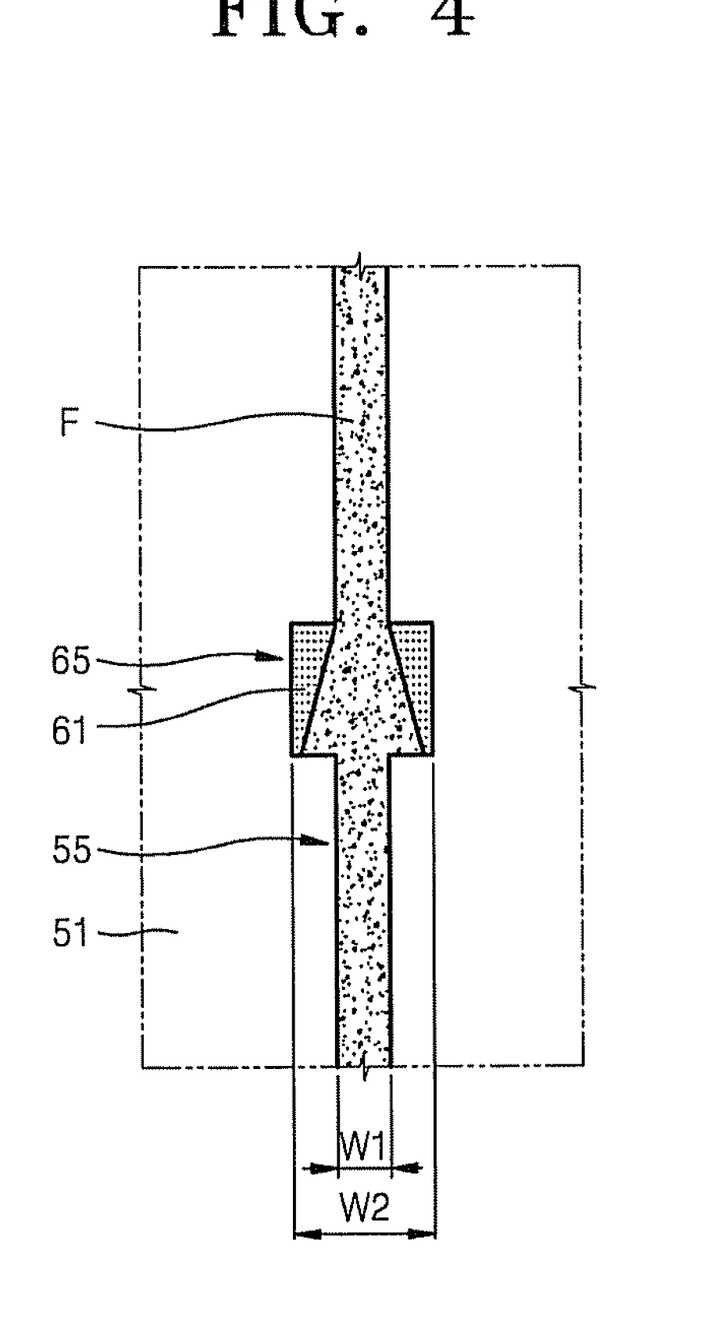
FIG. 4 is a plan view of a substrate of the valve unit illustrated in FIG. 2 when the channel is opened.

FIG. 2 is a cross-sectional view of an exemplary embodiment of a valve unit 50A according to the present invention. FIG. 3 is a plan view of a substrate of the valve unit 50A illustrated in FIG. 2 when a channel is closed, and FIG. 4 is a plan view of a substrate of the valve unit 50A illustrated in FIG. 2 when the channel is opened. Further, FIG. 2 is a cross-sectional view of the valve unit 50A taken along line i-i of FIG. 3.

Figure 7:
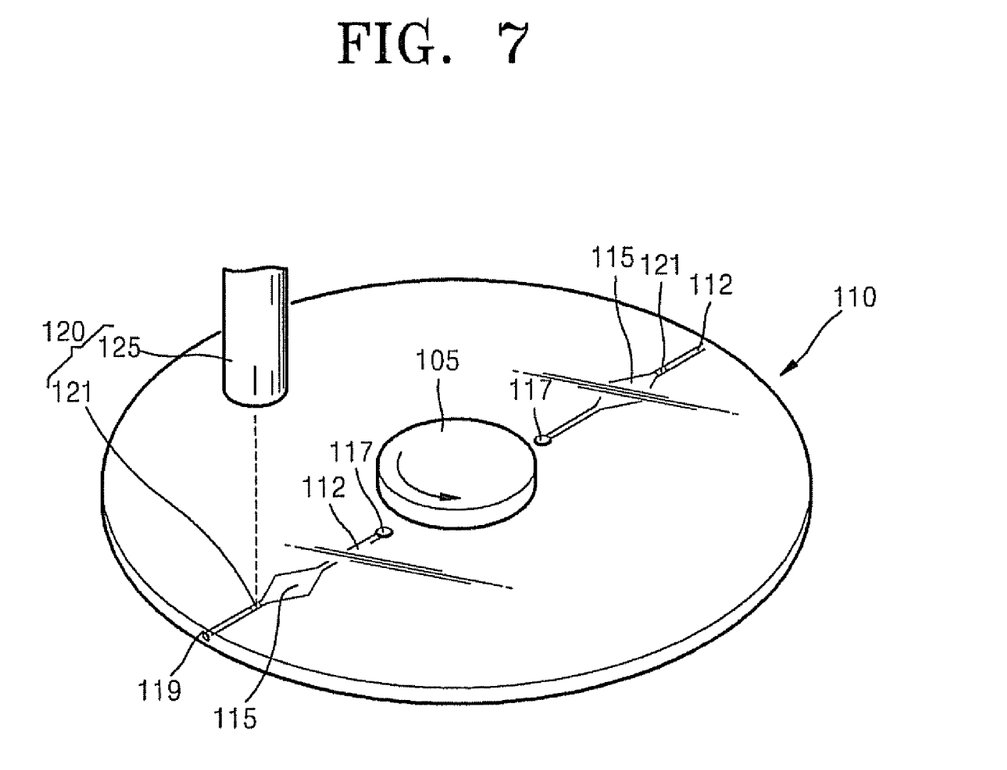
FIG. 7 is a perspective view of an apparatus having an exemplary embodiment of a valve unit according to the present invention.

Referring to FIGS. 2 through 4, the valve unit 50A includes a plug 60 which blocks a path defined by a channel 55, and a laser light source 70, which irradiates a laser beam on the plug 60, as an example of an external energy source for irradiating a laser on the plug 60. The channel 55 is formed in a base substrate 51. The base substrate 51 may be a substrate 110 of an apparatus 100, as illustrated in FIG. 7, for example. The base substrate 51 is formed of a laser-transmitting material, such as transparent glass, so that a laser irradiated from the laser light source 70 disposed outside the base substrate 51 can be incident on the plug 60. Alternatively, transparent plastic material may be used such that a laser beam can transmit through the transparent plastic material, which has a lower cost than glass.

The plug 60 includes a phase change material in a solid state at room temperature and a plurality of fine dissipating particles uniformly dispersed in the phase change material. The plug 60 blocks a flow of the fluid (F) by blocking the channel by being press fit against the inner walls of a predetermined portion of the channel 55. The phase change material may be wax. If the wax is heated, it is molten and is changed into a liquid state. As such, the plug 60 is destroyed and the path is opened allowing flow of the fluid (F). The wax of the plug 60 may have a predetermined melting point. If the melting point is too high, it takes a long time from initiating laser radiation to melting of the wax. Thus, it is difficult to precisely control a time for opening the channel 55. On the other hand, if the melting point is too low, the wax is partially molten in the state where a laser has not been irradiated on the fine heat-dissipating particles so that the fluid (F) may also leak. The wax may be paraffin wax, microcrystalline wax, synthetic wax or natural wax.

The phase change material may be a gel or thermo-plastic resin. The gel may be a polyacrylamide, polyacrylate, polymethacrylate or polyvinylamine. In addition, the thermoplastic resin may be a cycloolefin copolymer ("COC"), polymethylmethacrylate (acrylic) ("PMMA"), polycarbonate ("PC"), polystyrene ("PS"), polyoxymethylene (acetal) ("POM"), perfluoroalkoxy ("PFA"), polyvinyl alcohol (or polyvinyl acetate) ("PVC"), polypropylene ("PP"), polyethylene terephthalate ("PET"), polyetheretherketone ("PEEK"), polyamide (nylon) ("PA"), polysulfone ("PSU") or polyvinylidene fluoride ("PVDF").

The fine heat-dissipating particles have a diameter of about 1 nm to about 100 nm so that they can freely move within the channel 55 having a width of several thousands of micrometers (μm). If an electromagnetic wave such as a laser is irradiated on the fine heat-dissipating particles, due to its radiant energy, the temperature of the fine heat-dissipating particles rapidly rises so that the fine heat-dissipating particles that are uniformly dispersed in the wax dissipate heat. The fine heat-dissipating particles have a core including a metallic component and a hydrophobic surface structure. For example, the fine heat-dissipating particles may have a molecular structure including a core formed of Fe, and a plurality of surfactants, which are combined with iron (Fe) and surround Fe. In general, the fine heat-dissipating particles are dispersed in a carrier oil and are kept therein. The carrier oil may also be hydrophobic so that the fine heat-dissipating particles having a hydrophobic surface structure can be uniformly dispersed. The carrier oil in which the fine heat-dissipating particles are dispersed is poured into the wax and is mixed therewith so that a material used in forming the plug 60 can be manufactured. A shape of the fine heat-dissipating particles is not limited to a polymer illustrated in the above example but may be a quantum dot or a magnetic bead.

Figure 5:
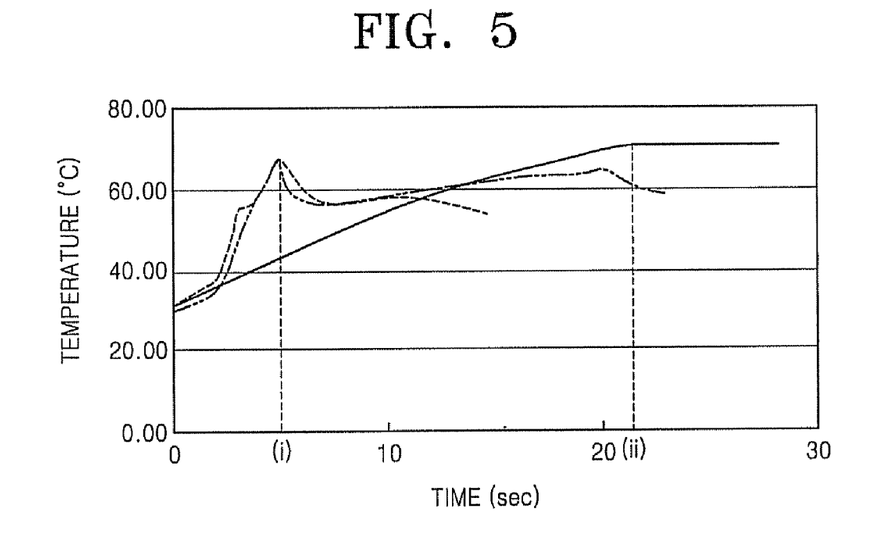
FIG. 5 is a graph of melting point (temperature) versus time in a case where a laser beam is irradiated on a pure paraffin wax and a paraffin wax including fine heat-dissipating particles for dissipating heat by laser radiation.

FIG. 5 is a graph of melting point (temperature) versus time in a case where a laser is irradiated on a pure paraffin wax and a paraffin wax including fine heat-dissipating particles for dissipating heat by laser radiation.

A graph indicated by a solid line in FIG. 5 is a temperature graph of pure (100%) paraffin wax, and a graph indicated by a dotted line in FIG. 5 is a temperature graph of 50% impurity (fine heat-dissipating particles) paraffin wax in which a carrier oil including fine heat-dissipating particles having an average diameter of 10 nm dispersed therein and the paraffin wax are mixed at a ratio of 1:1. A graph indicated by a chain thick line in FIG. 5 is a temperature graph of 20% impurity (fine heat-dissipating particles) paraffin wax in which the carrier oil including fine heat-dissipating particles having an average diameter of 10 nm dispersed therein and the paraffin wax are mixed at a ratio of 1:4. A laser beam having a wavelength of 808 nm was used in this experiment. A melting point of the paraffin wax was about 68-74° C. Referring to FIG. 5, the pure paraffin wax reached a melting point more than 20 seconds after laser irradiation (see (ii)). On the other hand, the 50% impurity (fine heat-dissipating particles) paraffin wax and the 20% impurity (fine heat-dissipating particles) paraffin wax were rapidly heated after laser radiation and reached the melting point about 5 seconds after laser irradiation (see (i)).

The fine heat-dissipating particles may include a ferromagnetic material such as iron (Fe), nickel (Ni), cobalt (Co) or an oxide thereof. In addition, the fine heat-dissipating particles may include a metallic oxide such as $Al_2O_3$, $TiO_2$, $Ta_2O_3$, $Fe_2O_3$, $Fe_3O_4$ or $HfO_2$. The position of the fine heat-dissipating particles including the ferromagnetic material can be easily adjusted using a magnet. Thus, if a plug material in which wax and fine heat-dissipating particles are mixed is inserted into the channel 55 and then the magnet is moved along the channel 55 while being close to the plug material outside the base substrate 51, the plug material including wax is pulled toward the magnet and is moved along the channel 55. The plug 60 can be located at a predetermined position of the channel 55 using this characteristic.

The laser light source 70 may include a laser diode. A laser light source for irradiating a pulse laser having an energy of at least 1 mJ/pulse and a laser light source for irradiating a continuous wave laser having an output of at least 10 mW may be used as the laser light source 70 of the valve unit 50A. In the experiment illustrated in FIG. 5, the laser light source 70 irradiated a laser beam having a wavelength of 808 nm. However, the present invention is not limited to this wavelength and a laser light source for irradiating a laser beam having a wavelength of about 750 nm to about 1300 nm may be used as the laser light source 70 of the valve unit 50A.

The valve unit 50A further includes a phase change material chamber 65 in which the molten wax and fine heat-dissipating particles mixed therewith are accommodated when the wax is molten by laser radiation and the channel 55 is opened. The phase change material chamber 65 is formed along the channel 55 to be adjacent to the plug 60 and extends to be a stepped shape on an inner side surface of the channel 55. Thus, the phase change material chamber 65 has a width W2, which is more extended than a width W1 of the channel 55.

As illustrated in FIG. 2, if a laser is irradiated by the laser light source 70 on the plug 60, fine heat-dissipating particles dispersed in the wax dissipate heat due to a rapid rise in temperature caused by an energy of the laser, and the wax is rapidly heated by this heat dissipation and is rapidly molten. Thus, the plug 60 is destroyed and the non-circulating fluid (F) flows along the channel 55. The wax and the fine heat-dissipating particles dispersed therein are accommodated in the phase change material chamber 65 and are solidified again. Reference numeral 61 in FIG. 4 denotes the wax and the fine heat-dissipating particles, which are solidified again in the above manner in the phase change material chamber 65.

Figure 6:
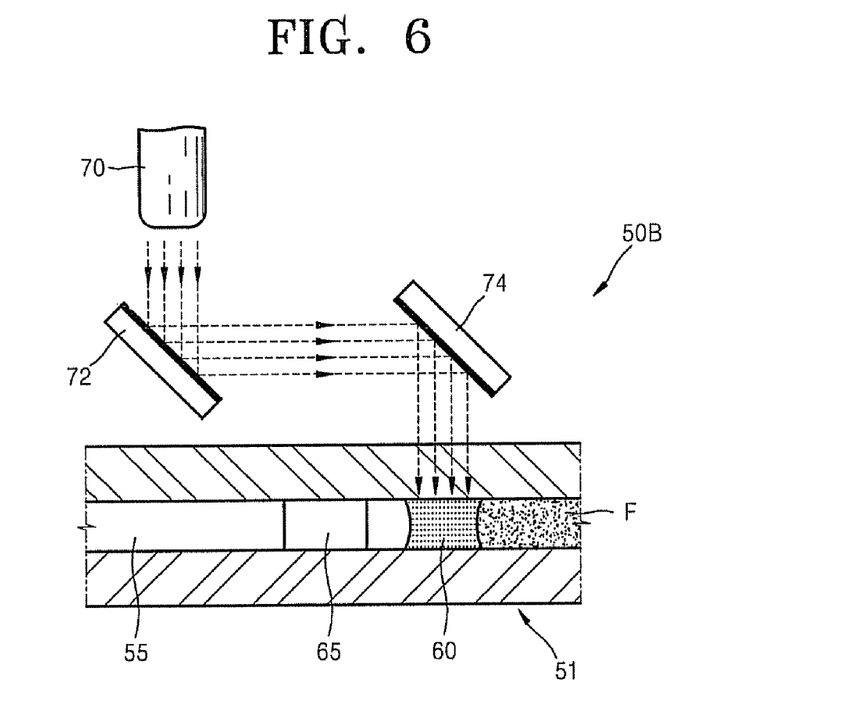
FIG. 6 is a cross-sectional view of another exemplary embodiment of a valve unit according to the present invention.

FIG. 6 is a cross-sectional view of another exemplary embodiment of a valve unit 50B according to the present invention. Referring to FIG. 6, like the valve unit 50A illustrated in FIGS. 2 through 4, the valve unit 50B includes a plug 60 which blocks a flow path formed by a channel 55, a laser light source 70 which irradiates a laser beam on the plug 60, and a phase change material chamber 65 in which wax and fine heat-dissipating particles dispersed therein are accommodated when the flow path is opened. The laser light source 70 of the valve unit 50B does not irradiate a laser beam directly toward the plug 60. The valve unit 50B further includes a light-path changing unit which changes a path of the laser beam so that the laser irradiated by the laser light source 70 can be directed toward the plug 60. The light-path changing unit includes a pair of mirrors 72 and 74. The laser beam irradiated by the laser light source 70 is sequentially reflected from the first mirror 72 and the second mirror 74, is transmitted through a base substrate 51 and is incident on the plug 60.

The number of laser light sources 70 and the number of plugs 60 may not correspond to each other. For example, when a plurality of channels 55 are formed in the base substrate 51, a plurality of plugs 60 may be provided. Even if only one channel 55 is formed in the base substrate 51, a plurality of plugs 60 may be provided to the one channel 55. In this case, if a predetermined light-path changing unit is provided, one laser light source 70 or a plurality of laser light sources 70 less than the number of the plugs 60 may irradiate a laser on the plurality of plugs 60.

FIG. 7 is a perspective view of an exemplary embodiment of an apparatus 100 having a valve unit according to the present invention. Referring to FIG. 7, the apparatus 100 includes a disc-shaped substrate 110, a spindle motor 105 for rotating the substrate 110 and a laser light source 125 for irradiating a laser beam on the substrate 110. The substrate 110 corresponds to the base substrate 51 illustrated in FIGS. 2 through 4. The substrate 110 includes a plurality of channels 112 (two shown) for forming a path of a fluid and a reaction chamber 115 disposed along a portion of each channel 112. A reaction of the fluid is performed in the reaction chamber 115. Each channel 112 extends in a radial direction of the substrate 110, an inlet 117 for the fluid is disposed at one end of each channel 112 proximate to a center of the substrate 110, and an outlet 119 for the fluid is disposed at the other end of each channel 112 proximate to a circumferential portion of the substrate 110. The fluid flowing into the channel 112 through the inlet 117 is pumped in the circumferential direction of the substrate 110, that is, in a direction toward the outlet 119, by a centrifugal force generated by rotation of the substrate 110. A pair of channels 112 are shown in FIG. 7. However, this is just one example and three or more channels or only one channel may be provided in alternative exemplary embodiments.

A plug 121 for blocking a flow of the fluid is disposed in each channel 112 in a position of the substrate 110 on which a laser irradiated by a laser light source 125 is incident. The plug 121 corresponds to the plug 60 illustrated in FIGS. 2 through 4. The plug 121 and the laser light source 125 constitute a valve unit 120 of the present invention. The valve unit 120 corresponds to the valve unit 50A illustrated in FIGS. 2 through 4, and thus, a detailed description of the plug 121 and the laser light source 125 of the valve unit 50A will be omitted.

Although not shown, a phase change material chamber (65, see FIGS. 2 through 4) in which the molten wax and the fine heat-dissipating particles mixed therein are accommodated may be further provided to the channel 112. In addition, a light-path changing unit including mirrors 72 and 74 (see FIG. 6), for example, may be further provided so that a laser beam can be irradiated by one laser light source 125 on a plurality of plugs 121 disposed on the substrate 110.

A valve unit for closing a path by melting, and thereby expanding, a plug made of a phase changing material (with or without fine heat-dissipating particles) and an apparatus using the same are also included in the present invention. In such a device the plug may be made to expand into a channel and thereby block the flow of fluid through that channel. One skilled in the art would realize that the plug may have various other uses to open, close, or partially obstruct a channel, all of which are within the scope of the present invention.

Meanwhile, a valve unit for opening a path by melting a plug by irradiating an electromagnetic wave on the plug formed of only a phase change material (not including fine heat-dissipating particles), and an apparatus having the same are also included in the present invention.

As described above, in the valve unit according to exemplary embodiments of the present invention, compared to the conventional valve unit having a plug including wax only, a response speed for opening the channel is faster such that a time for opening the channel can be precisely controlled. In addition, in the apparatus having the valve unit according to exemplary embodiments of the present invention, a unit for heating wax is not included in the substrate allowing the substrate to be made smaller.

In addition, in the valve unit according to exemplary embodiments of the present invention, a number of laser light sources being less than the number of plugs are provided with respect to a plurality of plugs such that costs for manufacturing the valve unit and the apparatus having the same can be reduced.

While the present invention has been particularly shown and described with reference to exemplary embodiments thereof, it will be understood by those of ordinary skill in the art that various changes in form and details may be made therein without departing from the spirit and scope of the present invention as defined by the following claims.

What is claimed is:

1. A valve unit comprising:
    a substrate;
    a channel formed in the substrate defining a path through which a fluid flows;
    a plug formed in the channel to block the path of the fluid in the channel when the plug is in a solid state at a room temperature, the plug including a phase change material and a plurality of heat-dissipating particles dispersed in a hydrophobic carrier oil which is mixed with the phase change material; and
    an external electromagnetic energy source which irradiates an electromagnetic energy on the plug such that the plurality of heat-dissipating particles dissipate heat and the phase change material become molten opening the path to allow the fluid to flow, and
    wherein the heat-dissipating particles include a ferromagnetic material or metallic oxide.

2. The valve unit of claim 1, further comprising a phase change material chamber disposed in a position where a flow of the fluid is not disturbed and in which the molten phase change material and the heat-dissipating particles mixed therein are accommodated.

3. The valve unit of claim 2, wherein the phase change material chamber is formed in the channel and has a more extended width than a width of the channel.

4. The valve unit of claim 1, further comprising:
    a light-path changing unit which changes a light-path of an electromagnetic wave irradiated by the external electromagnetic energy source to direct the electromagnetic wave toward the plug.

5. The valve unit of claim 4, wherein the light-path changing unit comprises at least one mirror.

6. The valve unit of claim 1, wherein the external electromagnetic energy source comprises a laser light source irradiating a laser beam on the plug.

7. The valve unit of claim 6, wherein the laser light source includes a laser diode.

8. The valve unit of claim 6, wherein the laser beam irradiated by the laser light source is a pulse electromagnetic wave having an energy of at least mJ/pulse.

9. The valve unit of claim 6, wherein the laser irradiated by the laser light source is a continuous electromagnetic wave having an output of at least 10 mW.

10. The valve unit of claim 6, wherein the laser beam irradiated by the laser light source has a wavelength of about 750 nm to about 1300 nm.

11. The valve unit of claim 1, wherein the heat-dissipating particles have a diameter of about 1 nm to about 100 μm.

12. The valve unit of claim 1, wherein the metallic oxide includes at least one material selected from the group consisting of $Al_2O_3$, $TiO_2$, $Ta_2O_3$, $Fe_2O_3$, $Fe_3O_4$ and $HfO_2$.

13. The valve unit of claim 1, wherein the heat-dissipating particles have at least one grain shape selected from the group consisting of a polymer, a quantum dot and a magnetic bead.

14. The valve unit of claim 13, wherein the magnetic bead includes at least one material selected from the group consisting of Fe, Ni, Cr and an oxide thereof.

15. The valve unit of claim 1, wherein the phase change material is at least one selected from the group consisting of wax, gel, and thermo-plastic resin.

16. The valve unit of claim 15, wherein the wax is at least one selected from the group consisting of a paraffin wax, a microcrystalline wax, a synthetic wax and a natural wax.

17. The valve unit of claim 15, wherein the gel is at least one selected from the group consisting of a polyacrylamide, a polyacrylate, a polymethacrylate, and a polyvinylamide.

18. The valve unit of claim 15, wherein the thermoplastic resin is at least one selected from the group consisting of a cycloolefin copolymer (COC), a polymethylmethacrylate (acrylic) (PMMA), a polycarbonate (PC), a polystyrene (PS), a polyoxymethylene (acetal) (POM), a perfluoroalkoxy (PFA), a polyvinyl alcohol or polyvinyl acetate (PVC), a polypropylene (PP), a polyethylene terephthalate (PET), a polyetheretherketone (PEEK), a polyamide (PA), a polysulfone (PSU) and a polyvinylidene fluoride (PVDF).

19. An apparatus having a valve unit, the apparatus comprising:
    a substrate having a reaction chamber in which a biochemical reaction of a biochemical fluid is performed;
    a channel formed in the substrate defining a path for the fluid; and
    a valve unit formed in the channel,
    wherein the valve unit comprises:
    a plug which is formed in the channel to close the path of a fluid in the channel when the plug is in a solid state at a room temperature, the plug including a phase change material and a plurality of heat-dissipating particles dispersed in a hydrophobic carrier oil which is mixed with the phase change material; and
    an external electromagnetic energy source which irradiates an electromagnetic energy on the plug such that the plurality of heat-dissipating particles dissipate heat and the phase change material become molten opening the path to allow the fluid to flow, and
    wherein the heat-dissipating particles include a ferromagnetic material or metallic oxide.

20. The apparatus of claim 19, wherein the valve unit further comprises a phase change material chamber disposed in a position where a flow of the fluid is not disturbed and in which the molten phase change material and the heat-dissipating particles mixed therein are accommodated.

21. The apparatus of claim 20, wherein the phase change material chamber is formed in the channel and has a more extended width than a width of the channel.

22. The apparatus of claim 19, further comprising:
    a light-path changing unit which changes a light-path of an electromagnetic wave irradiated by the external electromagnetic energy source to direct the electromagnetic wave toward the plug.

23. The apparatus of claim 22, wherein the light-path changing unit comprises at least one mirror.

24. The apparatus of claim 19, wherein the external electromagnetic energy source comprises a laser light source irradiating a laser beam on the plug.

25. The apparatus of claim 24, wherein the laser light source comprises a laser diode.

26. The apparatus of claim 24, wherein the laser beam irradiated by the laser light source is a pulse electromagnetic wave having an energy of at least 1 mJ/pulse.

27. The apparatus of claim 24, wherein the laser beam irradiated by the laser light source is a continuous wave electromagnetic wave having an output of at least 10 mW.

28. The apparatus of claim 24, wherein the laser irradiated by the laser light source has a wavelength of about 750 nm to about 1300 nm.

29. The apparatus of claim 19, wherein the heat-dissipating particles have a diameter of about 1 nm to about 100 μm.

30. The apparatus of claim 19, wherein the metallic oxide includes at least one material selected from the group consisting of $Al_2O_3$, $TiO_2$, $Ta_2O_3$, $Fe_2O_3$, $Fe_3O_4$ and $HfO_2$.

31. The apparatus of claim 19, wherein the heat-dissipating particles have at least one grain shape selected from the group consisting of a polymer, a quantum dot and a magnetic bead.

32. The valve unit of claim 31, wherein the magnetic bead includes at least one material selected from the group consisting of Fe, Ni, Cr and an oxide thereof.

33. The apparatus of claim 19, wherein the phase change material is at least one selected from the group consisting of a wax, a gel and a thermo-plastic resin.

34. The apparatus of claim 33, wherein the wax is at least one selected from the group consisting of a paraffin wax, a microcrystalline wax, a synthetic wax and a natural wax.

35. The apparatus of claim 33, wherein the gel is at least one selected from the group consisting of a polyacrylamide, a polyacrylate, a polymethacrylate, and a polyvinylamide.

36. The apparatus of claim 33, wherein the thermoplastic resin is at least one selected from the group consisting of a cycloolefin copolymer (COC), a polymethylmethacrylate (acrylic) (PMMA), a polycarbonate (PC), a polystyrene (PS), a polyoxymethylene (acetal) (POM), a perfluoroalkoxy (PFA), a polyvinyl alcohol or polyvinyl acetate (PVC), a polypropylene (PP), a polyethylene terephthalate (PET), a polyetheretherketone (PEEK), a polyamide (PA), a polysulfone (PSU) and a polyvinylidene fluoride (PVDF).

37. The apparatus of claim 19, wherein the substrate has a disc shape, the channel extends in a radial direction of the substrate and the biochemical fluid is pumped in a radially outwardly direction of the substrate by a centrifugal force generated by rotation of the substrate.

38. The apparatus of claim 19, wherein a plurality of channels, each having a reaction chamber, are provided on the substrate.

39. A valve unit comprising:
a plug which blocks a path of a fluid formed by a channel, the plug including a phase change material in a solid state at a room temperature and a plurality of heat-dissipating particles dispersed in a hydrophobic carrier oil which is mixed with the phase change material; and
an external electromagnetic energy source which irradiates an electromagnetic energy on the plug such that the phase change material is heated by the electromagnetic energy and becomes molten opening the path to allow the fluid to flow, and
wherein the heat-dissipating particles include a ferromagnetic material or metallic oxide.

40. An apparatus having a valve unit, the apparatus comprising:
a channel forming a path for a biochemical fluid;
a substrate having a reaction chamber in which a biochemical reaction of the biochemical fluid is performed; and
a valve unit blocking the path and opening the path at a predetermined time,
wherein the valve unit comprises:
a plug which blocks a path of a fluid formed by a channel, the plug including a phase change material in a solid state at a room temperature and a plurality of heat-dissipating particles dispersed in a hydrophobic carrier oil which is mixed with the phase change material; and
an external electromagnetic energy source which irradiates an electromagnetic energy the plug such that the phase change material is heated by the electromagnetic energy and becomes molten opening the path to allow the fluid to flow,
wherein the heat-dissipating particles include a ferromagnetic material or metallic oxide.

41. A valve unit comprising:
a plug which is disposed proximate to a fluid flow channel, the plug including a phase change material in a solid state at a room temperature and a plurality of heat-dissipating particles dispersed in a hydrophobic carrier oil which is mixed with the phase change material; and
an external electromagnetic energy source which irradiates an electromagnetic energy on the plug such that the phase change material is heated by the electromagnetic wave, becomes molten, and flows into the channel to obstruct fluid flow, and
wherein the heat-dissipating particles include a ferromagnetic material or metallic oxide.

42. A valve unit comprising:
a substrate;
a channel formed in the substrate through; and
a plug disposed opposite the channel, the plug including a phase change material and a plurality of heat-dissipating particles dispersed in a hydrophobic carrier oil which is mixed with the phase change material; and
an external electromagnetic energy source which irradiates an electromagnetic energy on the plug such that the plurality of heat-dissipating particles dissipate heat and the phase change material become molten, the plug expands into the channel thereby obstructing it, and
wherein the heat-dissipating particles include a ferromagnetic material or metallic oxide.

43. An apparatus having a valve unit, the apparatus comprising:
a channel forming a path for a biochemical fluid;
a substrate having a reaction chamber in which a biochemical reaction of the biochemical fluid is performed; and
a valve unit blocking the path and opening the path at a predetermined time,
wherein the valve unit comprises:
a plug which is disposed opposite the channel, the plug including a phase change material in a solid state at a room temperature and a plurality of heat-dissipating particles dispersed in a hydrophobic carrier oil which is mixed with the phase change material; and
an external electromagnetic energy source which irradiates an electromagnetic energy on the plug such that the phase change material is heated by the electromagnetic energy and becomes molten obstructing the path to reduce a fluid flow therethrough, and
wherein the heat-dissipating particles include a ferromagnetic material or metallic oxide.

* * * * *